(12) United States Patent
Tsai

(10) Patent No.: US 10,703,437 B2
(45) Date of Patent: Jul. 7, 2020

(54) ELECTRIC POWER CONTROL ASSEMBLY FOR BICYCLE ELECTRONIC DEVICE AND ELECTRIC POWER CONTROL SYSTEM HAVING THE SAME AND CONTROL METHOD THEREOF

(71) Applicant: TIEN HSIN INDUSTRIES CO., LTD., Taichung (TW)

(72) Inventor: Vince Tsai, Taichung (TW)

(73) Assignee: TIEN INDUSTRIES CO., LTD., Taichung (TW)

( * ) Notice: Subject to any disclaimer, the term of this patent is extended or adjusted under 35 U.S.C. 154(b) by 165 days.

(21) Appl. No.: 16/106,482

(22) Filed: Aug. 21, 2018

(65) Prior Publication Data

US 2020/0062340 A1 Feb. 27, 2020

(51) Int. Cl.
*G06F 1/00* (2006.01)
*B62M 6/80* (2010.01)
*G06F 1/3287* (2019.01)
*B62J 45/00* (2020.01)
*B62J 45/40* (2020.01)

(52) U.S. Cl.
CPC .............. *B62M 6/80* (2013.01); *G06F 1/3287* (2013.01); *B62J 45/00* (2020.02); *B62J 45/40* (2020.02)

(58) Field of Classification Search
CPC ......... B62M 6/80; G06F 1/3287; B62J 45/00; B62J 45/40
See application file for complete search history.

(56) References Cited

U.S. PATENT DOCUMENTS

| | | | | |
|---|---|---|---|---|
| 5,240,417 A * | 8/1993 | Smithson | ......... | A63B 21/00181 434/61 |
| 5,364,271 A * | 11/1994 | Aknin | .............. | A63B 21/00181 434/61 |
| 6,163,148 A * | 12/2000 | Takada | .................... | G01L 3/101 324/226 |
| 2013/0210583 A1* | 8/2013 | Kametani | ................ | B62J 99/00 482/8 |
| 2018/0072373 A1* | 3/2018 | Kishita | .................... | B62M 6/40 |

* cited by examiner

*Primary Examiner* — Ian Jen
(74) *Attorney, Agent, or Firm* — Tracy M. Helms; Apex Juris, pllc.

(57) ABSTRACT

An electronic power control assembly for a bicycle electronic device, a system having the same, and a control method thereof are disclosed. The electronic power control assembly is adapted to be electrically connected to a power source and a control module for controlling at least one electronic device on a bicycle to operate and includes a sensing unit for sensing a motion state of the bicycle, a first timing unit adapted to count a first predetermined time period, and a first control unit. When the sensing unit senses that the bicycle is in a moving state, the first control unit controls the first timing unit to recount and controls the power source to supply electricity to the control module. When the first timing unit finishes counting the first predetermined time period, the first control unit controls the power source to stop supplying electricity to the control module.

13 Claims, 5 Drawing Sheets

ELECTRIC POWER CONTROL ASSEMBLY FOR BICYCLE ELECTRONIC DEVICE AND ELECTRIC POWER CONTROL SYSTEM HAVING THE SAME AND CONTROL METHOD THEREOF

BACKGROUND OF THE INVENTION

Technical Field

The present disclosure relates to an electronic power control assembly for a bicycle electronic device, and more particularly to an electronic power control assembly for a bicycle electronic device, a system having the same, and a control method thereof, which could save power and lower the workloads of the electronic device, and also wake up electronic device fast.

Description of Related Art

In recent years, bicycles have become popular as being used in racing and sports, and also used by people as commuting purposes. Therefore, electronic devices used in bicycles are also booming. For example, the common electronic devices used in bicycles include electronic derailleurs (e.g. the front derailleur or the rear derailleur), electronic brake devices, electronic lifting seats, electronic lamps, etc.

Since the number of the electronic devices mounted on the bicycle is increased, electricity consumption is also increased. Therefore, there is a need for the manufacturers to provide a solution for properly managing the electricity supplied to the bicycle electronic devices, thereby achieving the purpose of saving energy. What's more, how to reduce the workload of each of the components for controlling the electronic device is one of the important problems to be solved.

BRIEF SUMMARY OF THE INVENTION

In view of the above, the primary objective of the present disclosure is to provide an electronic power control assembly for a bicycle electronic device and an electronic power control system with the electronic power control assembly, and a control method of the electronic power control system, whereby to save more power and to lower the workloads of the electronic device.

In addition, the another primary objective of the present disclosure is to determine whether to supply power to the control module which controls the electronic device by determining whether the bicycle is in a moving state or not.

The present disclosure provides an electronic power control assembly for a bicycle electronic device, which is adapted to be electrically connected to a power source and a control module, wherein the control module is adapted to control at least one electronic device on a bicycle to operate. The electronic power control assembly includes a sensing unit, a first timing unit, and a first control unit, wherein the sensing unit is adapted to sense a motion state of the bicycle. The first timing unit is adapted to count a first predetermined time period. The first control unit is electrically connected to the power source, the sensing unit, and the first timing unit, wherein when the sensing unit senses that the bicycle is in a moving state, the first control unit controls the first timing unit to recount and controls the power source to supply electricity to the control module. When the counted first predetermined time period in the first timing unit is completed, the first control unit controls the power source to stop supplying the electricity to the control module.

In an embodiment, when the sensing unit senses that the bicycle is changed from a stationary state to the moving state, the first control unit controls the first timing unit to recount and controls the power source to supply electricity to the control module.

The present disclosure further provides an electronic power control system, which is adapted to be disposed on a bicycle, including a power source, a control module, and an electronic power control assembly, wherein the control module is electrically connected to at least one electronic device on the bicycle and is adapted to control the at least one electronic device on the bicycle to operate. The electronic power control assembly includes a sensing unit, a first timing unit, and a first control unit, wherein the sensing unit is adapted to sense a motion state of the bicycle. The first timing unit is adapted to count a first predetermined time period. The first control unit is electrically connected to the power source, the sensing unit, and the first timing unit, wherein when the sensing unit senses that the bicycle is in a moving state, the first control unit controls the first timing unit to recount and controls the power source to supply electricity to the control module. When the counted first predetermined time period in the first timing unit is completed, the first control unit controls the power source to stop supplying the electricity to the control module In an embodiment, when the sensing unit senses that the bicycle is changed from a stationary state to the moving state, the first control unit controls the first timing unit to recount and controls the power source to supply electricity to the control module.

In an embodiment, the control module includes a second control unit and a second timing unit, which are electrically connected to each other; the second timing unit is adapted to count a second predetermined time period. When the counted second predetermined time period in the second timing unit is completed, the second control unit controls the at least one electronic device to enter a low voltage mode from a normal mode, wherein the at least one electronic device consumes less power in the low voltage mode than in the normal mode.

In an embodiment, the control module includes a communication unit connected to the second control unit. When the communication unit receives a control signal for controlling the at least one electronic device, the second control unit controls the at least one electronic device to enter the normal mode from the low voltage mode and controls the second timing unit to time the second predetermined time period, and sends a reset signal to the electronic power control assembly, so as to control the first timing unit to recount the first predetermined time period.

In an embodiment, after the second timing unit finishes counting the second predetermined time period, the second timing unit further counts a third predetermined time period. When the second timing unit finishes counting the third predetermined time period, the second control unit controls the at least one electronic device to enter a sleep mode from the low voltage mode, wherein the at least one electronic device consumes less power in the sleep mode than in the low voltage mode.

In an embodiment, a length of the first predetermined time period is greater than a length of the second predetermined time period, and the length of the first predetermined time period is greater than a length of the third predetermined time period.

In an embodiment, the length of the first predetermined time period is greater than a sum of the length of the second predetermined time period and the length of the third predetermined time period.

The present disclosure further provides a control method of an electronic power control system, including the steps of count the first predetermined time period by the first timing unit; sense whether the bicycle is in the moving state or not by the sensing unit; if so, the first control unit controls the first timing unit to recount, and controls the power source to supply electricity to the control module; otherwise, determine whether the counted first predetermined time period is completed or not; if the counted first predetermined time period is completed, the first control unit controls the power source to stop supplying electricity to the control module.

In an embodiment, when the sensing unit senses that the bicycle is in the moving state and the power source supplies electricity to the control module, a second timing unit of the control module counts a second predetermined time period.

In an embodiment, further including a step of determine whether the control module is received a control signal or not; if so, the control module sends a reset signal to the electronic power control assembly, so as to control the first timing unit to recount the first predetermined time period and to control the at least one electronic device in response to the control signal; otherwise, determine whether the counted second predetermined time period is completed or not; once the counted first predetermined time period is completed, the control module controls the at least one electronic device to enter a low voltage mode from a normal mode, wherein the at least one electronic device consumes less power in the low voltage mode than in the normal mode.

In an embodiment, further including a step of further count a third predetermined time period when the counted second predetermined time period is completed. Once the counted third predetermined time period is completed, the control module controls the at least one electronic device to enter a sleep mode from the low voltage mode, wherein the at least one electronic device consumes less power in the sleep mode than in the low voltage mode.

With the aforementioned design, the disclosure of the present invention could determine whether to supply electric energy to the control module 30 or not by detecting whether the bicycle is in the moving state or not, whereby to achieve the purpose of saving power and saving energy. In addition, by disposing an individual power control member, or by disposing power control member integrated with the power source, or by disposing power control member on the circuit between the power source and the control module to sense the movement of the bicycle, the load of the control module could be effectively reduced, so that the control module only needs to determine whether to control the operation of the electronic device or not.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
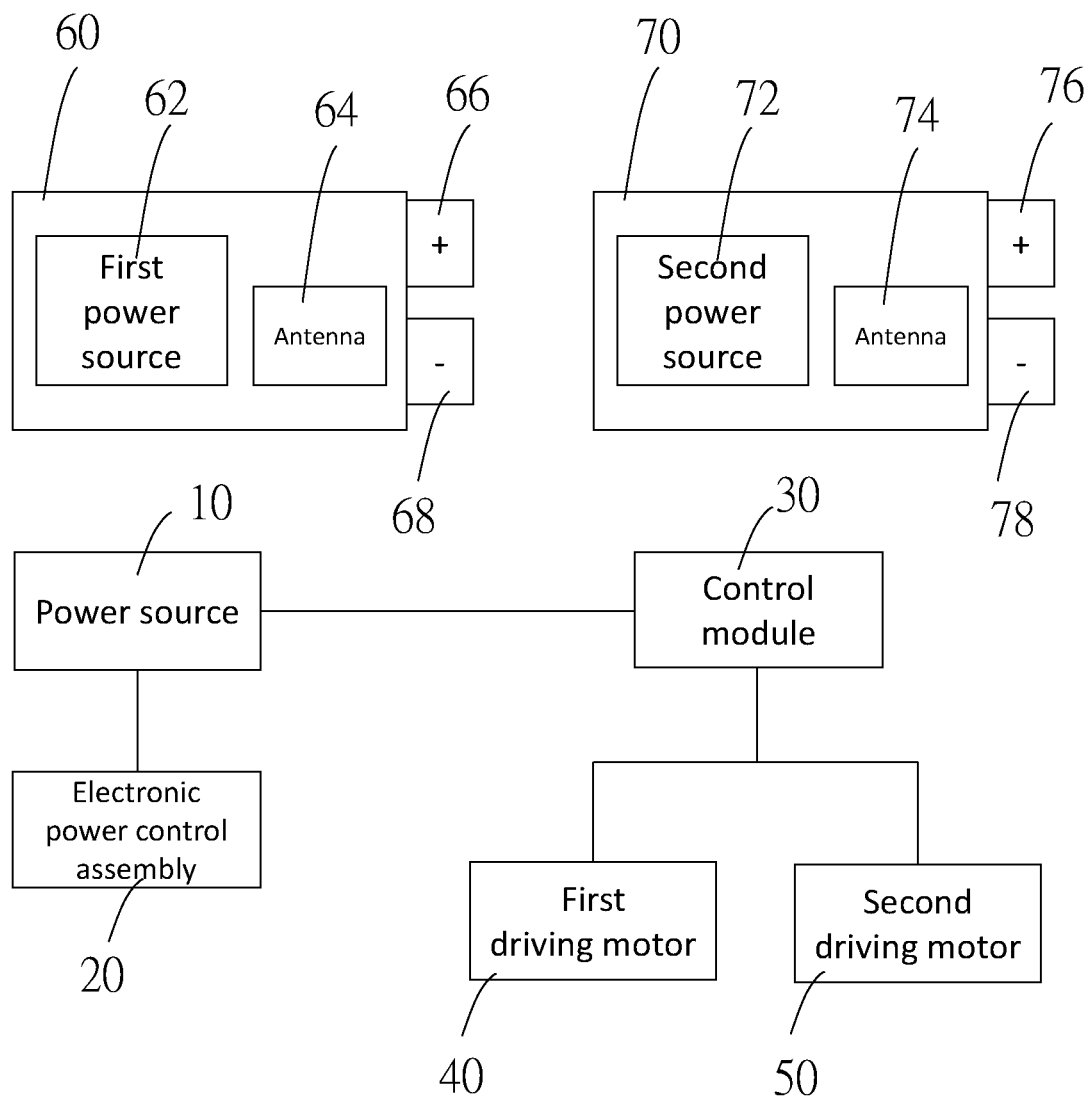
FIG. 1 is a schematic view of the electronic power control system according to an embodiment of the present disclosure.
Figure 2:
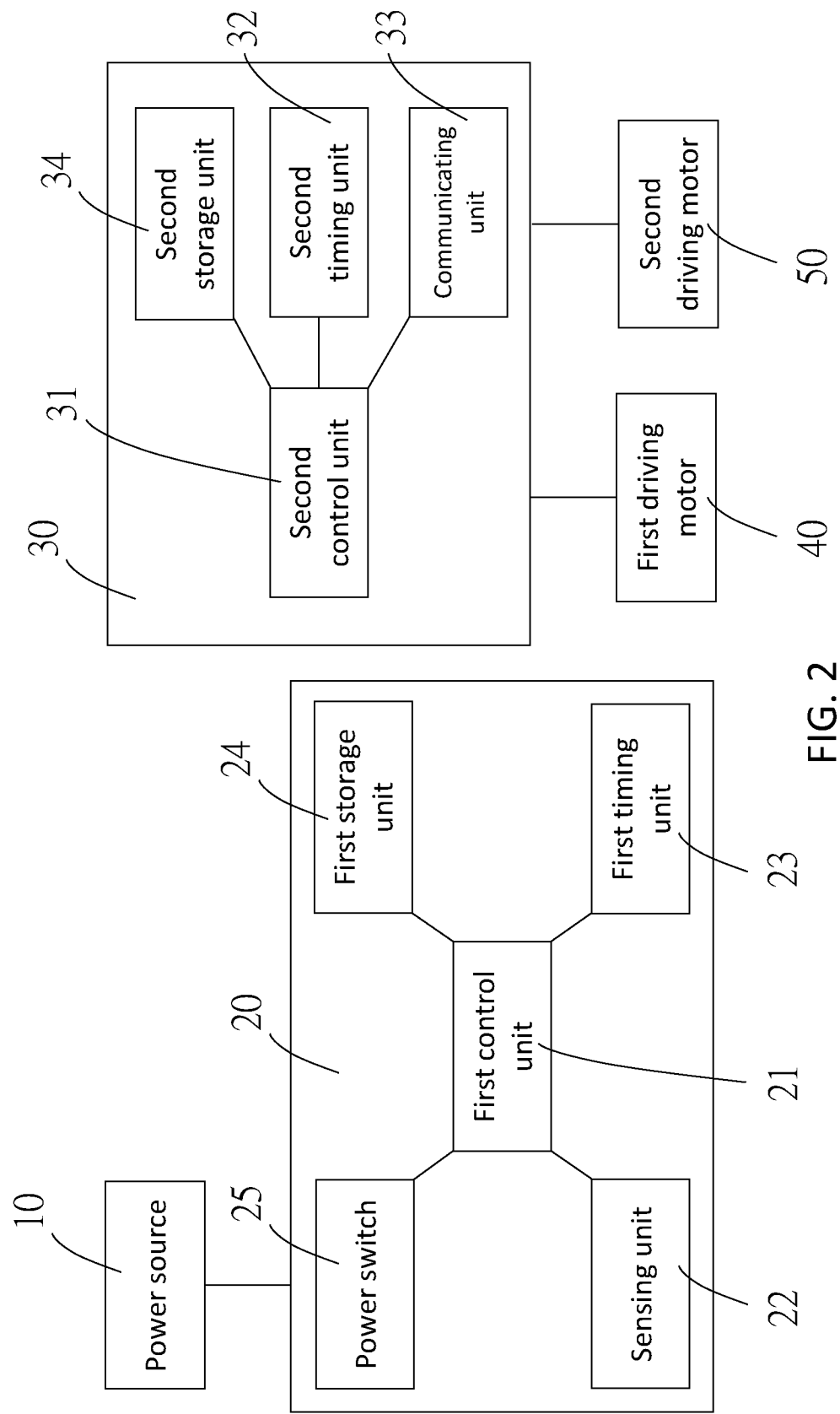
FIG. 2 is a schematic view of the electronic power control system according to an embodiment of the present disclosure.

An electronic power control system according to an embodiment of the present disclosure is illustrated in FIG. 1 and FIG. 2. The electronic power control system is adapted to be disposed on a bicycle (not shown) and includes a power source 10, an electronic power control assembly 20, and a control module 30.

The power source 10 is controllable to selectively supply electricity to at least one electronic device on the bicycle. In the current embodiment, there are two electronic devices which include a front derailleur and a rear derailleur, wherein the front derailleur includes a first driving motor 40 for driving the front derailleur to shift gears, and the rear derailleur includes a second driving motor 50 for driving the rear derailleur to shift gears. However, in other embodiments, the electronic device could be an electronically controlled seat tube, an electronically controlled shock absorber, a power meter, or other electronically controlled bicycle components.

In addition, the bicycle is provided with a first controller 60 for controlling the front derailleur and a second controller 70 for controlling the rear derailleur, wherein the first controller 60 includes a first power source 62, an antenna 64, a upshifting button 66, and a downshifting button 68, and the second controller 70 includes a second power source 72, an antenna 74, a upshifting button 76, and a downshifting button 78. The first power source 62 and the second power source 72 are adapted to respectively supply electricity to the first controller 60 and the second controller 70. In the current embodiment, the first power source 62 and the second power source 72 are batteries. However, the first power source 62 and the second power source 72 are not limited to be batteries, but could be some components that could supply the electrical energy required for the first controller 60 and the second controller 70. The upshifting button 66 and the downshifting button 68 of the first controller 60 are respectively adapted to be operated by a user and thereby to generate corresponding upshifting or downshifting control signals for the front derailleur. The upshifting button 76 and the downshifting button 78 of the second controller 70 are respectively adapted to be operated by the user, and thereby to generate corresponding upshifting or downshifting control signals for the rear derailleur. The antenna 64 of the first controller 60 and the antenna 74 of the second controller 70 are respectively adapted to transmit the aforementioned control signals. In practice, the control signals could be transmitted by the antennas via wireless transmission. However, in other embodiments, the control signals could be transmitted via wired transmission.

The electronic power control assembly 20 is adapted to be electrically connected to the power source 10 and the control module 30. In the current embodiment, the electronic power control assembly 20 is integrated with the power source 10. However, in other embodiments, the electronic power control assembly 20 could be an individual component which is electrically connected between the power source 10 and the control module 30.

The electronic power control assembly 20 includes a first control unit 21, a sensing unit 22, and a first timing unit 23, wherein the first control unit 21 is electrically connected to the sensing unit 22 and the first timing unit 23. The sensing unit 22 is adapted to sense a motion state of the bicycle. For instance, the sensing unit 22 could be a G-sensor, a Gyro Meter, a mercury switch, a proximity switch, etc. In the current embodiment, the sensing unit 22 is a G-sensor that could detect whether the bicycle is in a moving state or in a non-moving state (or a stationary state). For instance, when the user is riding the bicycle and there is a movement or vibration, the sensing unit 22 could sense the acceleration variation, whereby to determine the bicycle is in the moving state. Also, when the bicycle remains stationary, the sensing unit 22 could sense that the acceleration does not change, whereby to determine the bicycle is in the non-moving state (or the stationary state). The first timing unit 23 is adapted to count a first predetermined time period, wherein the counting could be a countdown method or a stopwatch method. When the first timing unit 23 finishes counting the first predetermined time period, indicating that the bicycle is in the non-moving state (or the stationary state) during the first predetermined time period, the first control unit 21 controls the power source 10 to stop supplying electricity to the control module 30 for saving power. In addition, when the sensing unit 22 senses that the bicycle is in the moving state, the first control unit 21 controls the first timing unit 23 to recount (i.e., to reset the first predetermined time period and count the first predetermined time period), and control the power source 10 to supply electricity to the control module 30. Besides, when the sensing unit 22 senses that the bicycle changes from the stationary state to the moving state, the first control unit 21 also controls the first timing unit 23 to recount and control the power source 10 to supply electricity to the control module 30.

In addition, the electronic power control assembly 20 further includes a first storage unit 24 and a power switch 25, wherein the first storage unit 24 is electrically connected to the first control unit 21 and adapted to store setting data relating to the electronic power control assembly 20. For instance, the stored setting data could be a plurality of different lengths of the first predetermined time period for being selected by the user or could be setting data of the sensing unit 22. However, the data stored in the first storage unit is not a limitation of the present invention. The power switch 25 is electrically connected to the first control unit 21 and the power source 10, wherein the first control unit 21 controls the power switch 25 to turn on or off so as to make the power source 10 to supply or stop supplying electricity to the control module 30.

The control module 30 is electrically connected to the at least one electronic device on the bicycle, whereby to control an operation of the at least one electronic device. In the current embodiment, the control module 30 is disposed on the front derailleur and is capable of controlling the first driving motor 40 and the second driving motor 50 to operate. In the current embodiment, the control module 30 includes a second control unit 31, a second timing unit 32, a communication unit 33, and a second storage unit 34, wherein the second timing unit 32, the communication unit 33, and the second storage unit 34 are electrically connected to the second control unit 31, and the communication unit 33 is adapted to communicate with the controller, which controls the at least one electronic device, in a wired or wireless transmission manner. In the current embodiment, the communication unit 33 wirelessly communicates with the antennas 64, 74 of the first controller 60 and the second controller 70, whereby to receive signals sent by the first controller 60 and the second controller 70, such as a control signal for controlling the front derailleur or the rear derailleur to shift gears. When the communication unit 33 receives said control signal, the second control unit 31 operates in response to the control signal. More specifically, when the communication unit 33 receives the control signal for the front derailleur or the rear derailleur to upshifting or downshifting, the second control unit 31 further controls the first driving motor 40 or the second driving motor 50 to operate, so that the front derailleur or the rear derailleur shift gears accordingly.

The second timing unit 32 is adapted to count a second predetermined time period. When the second timing unit 32 finishes counting the second predetermined time period, the second control unit 31 controls the at least one electronic device, such as the front derailleur and the rear derailleur as described above, to enter a low voltage mode from a normal mode, wherein the at least one electronic device consumes less power in the low voltage mode than in the normal mode, thereby achieving the purpose of saving energy. After the second timing unit 32 finishes counting the second predetermined time period, the second timing unit 32 further counts a third predetermined time period. When the second timing unit 32 finishes counting the third predetermined time period, the second control unit 31 controls the at least one electronic device to enter a sleep mode from the low voltage mode, wherein the at least one electronic device consumes less power in the sleep mode than in the low voltage mode, thereby achieving the purpose of saving energy. In an embodiment, when the control module 30 receives a control signal sent by a controller (e.g. the first controller 60 or the second controller 70 as mentioned above) corresponding to the at least one electronic device, the control module 30 wakes up the at least one electronic device, so that the at least one electronic device could resume to the normal mode. In an embodiment, the low voltage mode could be achieved by, for example, lowering display brightness of the electronic device or other methods to reduce power consumption. The sleep mode could be achieved by, for example, turning off the display of the electronic device or other methods to further reduce power consumption. However, the aforementioned methods are not limitations of the present invention. In the current embodiment, the second storage unit 34 is adapted to store data related to controlling the electronic device or data related to the lengths of the second predetermined time period and the third predetermined time period, however, this is not a limitation of the present invention.

Figure 3:
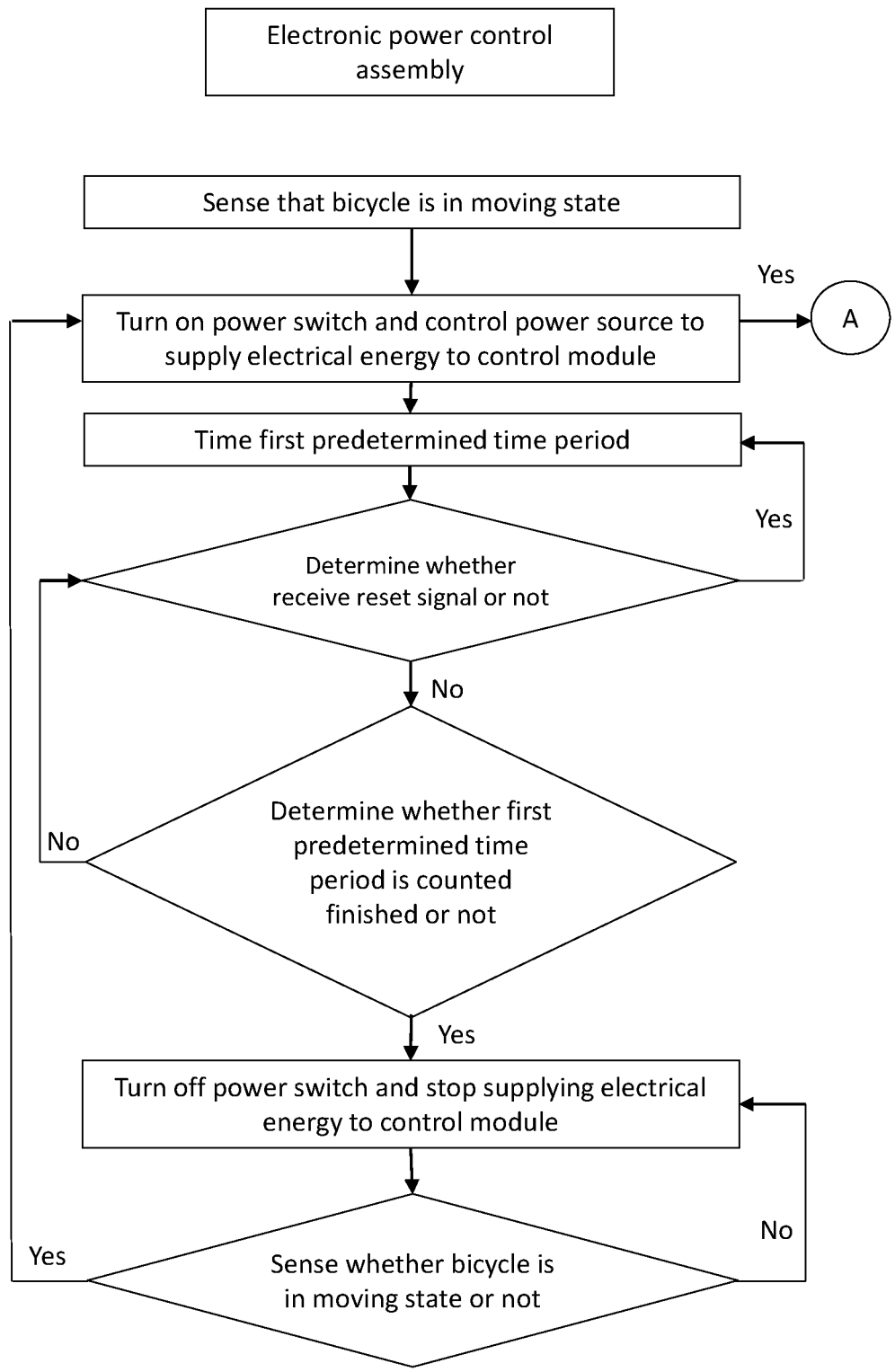
FIG. 3 is a flowchart of the control method of the electronic power control system according to the embodiment of the present disclosure.
Figure 4:
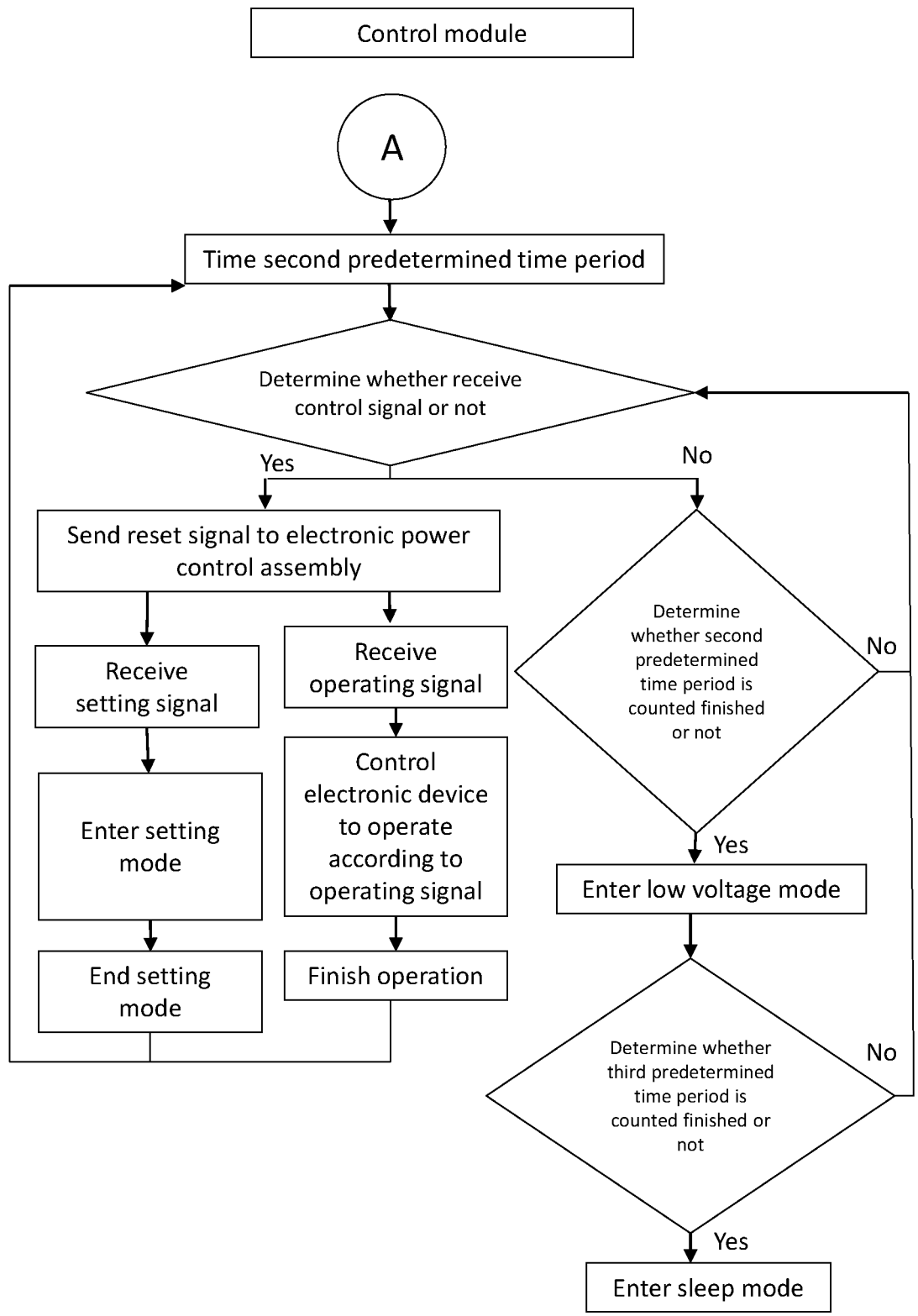
FIG. 4 is a flowchart of the control method of the electronic power control system according to the embodiment of the present disclosure.

Referring to FIG. 2 to FIG. 4, a control method of the electronic power control system according to the present invention will be described in detail herein.

First, when the sensing unit 22 of the electronic power control assembly 20 senses that the bicycle is in the moving state, the first control unit 21 controls the power switch 25 to turn on, so as to control the power source 10 to supply electricity to the control module 30, and the first control unit 21 also controls the first timing unit 23 to count the first predetermined time period, and the second control unit 31 controls the second timing unit 32 to count the second predetermined time period. In addition, the first control unit 21 determines whether the electronic power control assembly 20 receives a reset signal or not. In the current embodiment, the first control unit 21 determines whether the control module 30 receives a control signal sent from the first controller 60 or the second controller 70 or not. If so, the control module 30 sends a reset signal to the electronic power control assembly 20, whereby to recount the first predetermined time period; otherwise, the electronic power control assembly 20 determines whether the counted first predetermined time period is completed or not. If the counted first predetermined time period is not completed, the electronic power control assembly 20 continues to monitor whether the control module 30 receives the control signal or not; if the counted first predetermined time period is completed, the first control unit 21 controls the power switch 25 to turn off, so that the power switch 25 controls the power source 10 to stop supplying electricity to the control module 30. After that, the sensing unit 22 continuously senses whether the bicycle is in the moving state or not.

In addition, as shown in FIG. 4, when the control signal is not received, the control module 30 determines whether the counted second predetermined time period is completed or not. If the counted second predetermined time period is not completed, return to the step of detecting whether the control signal is received or not, i.e., the control module 30 would continue to determine whether the control signal is received or not; if the counted second predetermined time period is completed, the second control unit 31 controls the at least one electronic device (e.g. the front derailleur or the rear derailleur) to enter the low voltage mode from the normal mode, wherein the at least one electronic device consumes less power in the low voltage mode than in the normal mode.

Moreover, after the counted second predetermined time period in the second timing unit 32 is ended, the second timing unit 32 further counts the third predetermined time period and the control module 30 determines whether the counted third predetermined time period is completed or not. If the counted third predetermined time period is not completed, return to the step of detecting whether the control signal is received or not, i.e. the control module 30 would continue to determine whether the control signal is received or not. When the counted third predetermined time period in the second timing unit 32 is completed, the second control unit 31 controls the at least one electronic device to enter the sleep mode from the low voltage mode, and selectively saves a current setting of the at least one electronic device into the second storage unit 34, wherein the at least one electronic device consumes less power in the sleep mode than in the low voltage mode. It shall be noted that, in an embodiment, when the at least one electronic device is in the low voltage mode, the electronic device could still function normally as in the normal mode.

Figure 5:
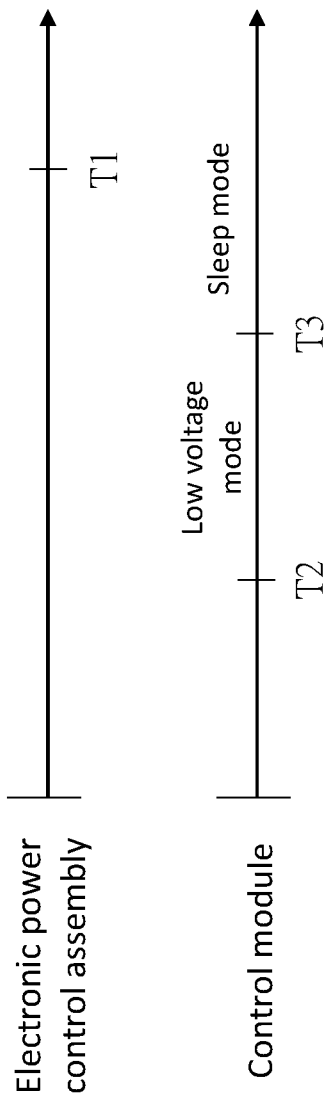
FIG. 5 is a schematic view, showing the lengths of the first, second, and third predetermined time periods.

As shown in FIG. 5, the first predetermined time period is denoted as T1, the second predetermined time period is denoted as T2, and the third predetermined time period is denoted as T3. In an embodiment, the electronic power control assembly 20 and the control module 30 respectively start counting the first predetermined time period and the second predetermined time period at the same time, wherein the length of the first predetermined time period is greater than the length of the second predetermined time period, and the length of the first predetermined time period is also greater than the length of the third predetermined time period. More specifically, in an embodiment, the length of the first predetermined time period is greater than the sum of the length of the second predetermined time period and the length of the third predetermined time period.

Preferably, in the current embodiment, when the at least one electronic device enters the sleep mode, it is necessary to wait the control module 30 to perform initialization on the at least one electronic device upon receiving a control signal sent by the controller corresponding to the at least one electronic device to make the at least one electronic device return to the normal mode (i.e., a normal operating mode) from the sleep mode (or a shutdown mode), and thereby to continue the steps shown in FIG. 4 from step A.

Also, when the control module 30 receives a control signal, the control module 30 controls the electronic device to operate in response to the control signal. Preferably, in the current embodiment, the control module 30 further determines which kind of the control signal is. For instance, in a case that when the received control signal is a setting signal, the control module 30 controls the electronic device to enter a setting mode to be set by the user. In the current embodiment, said setting signal could be related to, but not limited to, a setting for the front derailleur or the rear derailleur to upshifting or downshifting, a setting for the lengths of the second predetermined time period and the third predetermined time period, or an initialization setting for the connected front or rear derailleur. After the setting is done, end the setting mode, recount the second predetermined time period, and return to the step of detecting whether the control signal is received or not. In addition, in a case that when the received control signal is an operating signal for controlling the electronic device, for example, such as an operating signal for controlling the front or rear derailleur to shift gears, the control module 30 controls the electronic device (e.g. the first driving motor 40 of the front derailleur or the second driving motor 50 of the rear derailleur) to operate in response to the operating signal (e.g. to shift up or down gears). After that, recount the second predetermined time period, and return to the step of detecting whether the control signal is received or not.

With the aforementioned design, the electronic power control assembly, system, and control method thereof according to the present invention could determine whether to supply electricity to the control module 30 by determining whether the bicycle is in the moving state or not, whereby to achieve the purpose of saving energy. In addition, according to the design of the electronic power control assembly of the present invention, determining whether the bicycle is in the moving state or not is performed by the electronic power control assembly 20, whereby to reduce the workloads of other electronic devices, and to effectively specialize the work for each of the components (e.g. the electronic power control assembly, the control module, the electronic equipment, etc.), simplifying the execution and control process of the electronic power control system.

In the aforementioned embodiments, the control module 30 is integrated with the front derailleur. However, in other embodiments, the control module could be integrated with the rear derailleur or could be an individual component which communicates with the front or rear derailleur in a wired or wireless transmission manner to control the front or rear derailleur to operate.

Also, in other embodiments, the electronic device is not limited by the electronic derailleur (e.g. the front derailleur or the rear derailleur) as exemplified above, but could be an electronic brake device, an electronic lifting seat, an electronic lamp, or etc.

It must be pointed out that the embodiments described above are only some preferred embodiments of the present disclosure. All equivalent structures and method which employ the concepts disclosed in this specification and the appended claims should fall within the scope of the present disclosure.

What is claimed is:

1. An electronic power control assembly for a bicycle electronic device, which is adapted to be electrically connected to a power source and a control module, wherein the control module is adapted to control at least one electronic device on a bicycle to operate; the electronic power control assembly comprising:
   a sensing unit which is adapted to sense a motion state of the bicycle;
   a first timing unit which is adapted to count a first predetermined time period; and
   a first control unit, which is electrically connected to the power source, the sensing unit, and the first timing unit, wherein when the sensing unit senses that the bicycle is in a moving state, the first control unit controls the first timing unit to recount and controls the power source to supply electricity to the control module; when the counted first predetermined time period in the first timing unit is completed, the first control unit controls the power source to stop supplying the electricity to the control module.

2. The electronic power control assembly of claim 1, wherein when the sensing unit senses that the bicycle is changed from a stationary state to the moving state, the first control unit controls the first timing unit to recount and controls the power source to supply electricity to the control module.

3. An electronic power control system, which is adapted to be disposed on a bicycle, comprising:
   a power source;
   a control module, which is electrically connected to at least one electronic device on the bicycle and is adapted to control the at least one electronic device on the bicycle to operate; and
   an electronic power control assembly, comprising:
   a sensing unit which is adapted to sense a motion state of the bicycle;
   a first timing unit which is adapted to count a first predetermined time period; and
   a first control unit, which is electrically connected to the power source, the sensing unit, and the first timing unit, wherein when the sensing unit senses that the bicycle is in a moving state, the first control unit controls the first timing unit to recount and controls the power source to supply electricity to the control module; when the counted first predetermined time period in the first timing unit is completed, the first control unit controls the power source to stop supplying electricity to the control module.

4. The electronic power control system of claim 3, wherein when the sensing unit senses that the bicycle is changed from a stationary state to the moving state, the first control unit controls the first timing unit to recount and controls the power source to supply electricity to the control module.

5. The electronic power control system of claim 3, wherein the control module includes a second control unit and a second timing unit, which are electrically connected to each other; the second timing unit is adapted to count a second predetermined time period; when the counted second predetermined time period in the second timing unit is completed, the second control unit controls the at least one electronic device to enter a low voltage mode from a normal mode, wherein the at least one electronic device consumes less power in the low voltage mode than in the normal mode.

6. The electronic power control system of claim 5, wherein the control module includes a communication unit connected to the second control unit; when the communication unit receives a control signal for controlling the at least one electronic device, the second control unit controls the at least one electronic device to enter the normal mode from the low voltage mode and controls the second timing unit to time the second predetermined time period, and sends a reset signal to the electronic power control assembly, so as to control the first timing unit to recount the first predetermined time period.

7. The electronic power control system of claim 5, wherein after the second timing unit finishes counting the second predetermined time period, the second timing unit further counts a third predetermined time period; when the second timing unit finishes counting the third predetermined time period, the second control unit controls the at least one electronic device to enter a sleep mode from the low voltage mode, wherein the at least one electronic device consumes less power in the sleep mode than in the low voltage mode.

8. The electronic power control system of claim 7, wherein a length of the first predetermined time period is greater than a length of the second predetermined time period, and the length of the first predetermined time period is greater than a length of the third predetermined time period.

9. The electronic power control system of claim 8, wherein the length of the first predetermined time period is greater than a sum of the length of the second predetermined time period and the length of the third predetermined time period.

10. A control method of an electronic power control system as claimed in claim 3, comprising the steps of:
    counting the first predetermined time period by the first timing unit; and
    sensing whether the bicycle is in the moving state or not by the sensing unit; if so, the first control unit controls the first timing unit to recount, and controls the power source to supply electricity to the control module; otherwise, determining whether the counted first predetermined time period is completed or not; if the counted first predetermined time period is completed, the first control unit controls the power source to stop supplying electricity to the control module.

11. The method of claim 10, wherein when the sensing unit senses that the bicycle is in the moving state and the power source supplies electricity to the control module, a second timing unit of the control module counts a second predetermined time period.

12. The method of claim 11, further comprising a step of determining whether the control module is received a control signal or not; if so, the control module sends a reset signal to the electronic power control assembly, so as to control the first timing unit to recount the first predetermined time period and to control the at least one electronic device in response to the control signal; otherwise, determining whether the counted second predetermined time period is completed or not; once the counted first predetermined time period is completed, the control module controls the at least one electronic device to enter a low voltage mode from a normal mode, wherein the at least one electronic device consumes less power in the low voltage mode than in the normal mode.

13. The method of claim 12, further comprising a step of further counting a third predetermined time period when the counted second predetermined time period is completed; once the counted third predetermined time period is completed, the control module controls the at least one electronic device to enter a sleep mode from the low voltage mode, wherein the at least one electronic device consumes less power in the sleep mode than in the low voltage mode.

* * * * *